UNITED STATES PATENT OFFICE.

LOFTUS GRAY, OF CLEVELAND, OHIO.

EXPLOSIVE.

975,030. Specification of Letters Patent. Patented Nov. 8, 1910.

No Drawing. Application filed July 31, 1909. Serial No. 510,583.

*To all whom it may concern:*

Be it known that I, LOFTUS GRAY, citizen of the United States, residing at Cleveland, in the county of Cuyahoga and State of Ohio, have invented certain new and useful Improvements in Explosives, of which the following is a specification.

This invention relates to explosives; and it comprises a grained explosive consisting of a mixture of granules of chlorate of potash and granules of a soluble crystalline carbohydrate, which is best ordinary sugar, said chlorate granules being coated, shielded and protected by a dry filmiform layer composed of a gummy carbohydrate in admixture with some portion of said soluble carbohydrate, said shielding layer also acting as a grain forming binder between adjacent granules of chlorate and of carbohydrate, the gummy carbohydrate employed being advantageously a colloid body of the nature of gum arabic; all as more fully set forth and as claimed.

Chlorate of potash and combustible bodies form a powder of excellent explosive properties, but such a mixture in and of itself has never proved successful in the art owing to its instability. In the present invention, means are adopted to secure the advantages of this explosive without the disadvantage of its instability.

In the present invention a granular soluble carbohydrate, which is advantageously granulated sugar, is mixed with granular chlorate of potash and with a protective and shielding gummy carbohydrate body in solution, the method of incorporating these bodies together being such as to cause the gummy carbohydrate in admixture with more or less of dissolved soluble carbohydrate, to form a shielding and protecting filmiform coating and binding layer upon the granules of the chlorate and the carbohydrate. These ingredients, the sugar and the chlorate of potash, usually are found to give the best results for blasting and the like when mixed in about equal proportions, or about half and half, but as to relative quantities I do not fix an arbitrary rule because I can vary the proportions and still get very satisfactory results, according to uses intended. For example, in an aggregate or total of say one hundred pounds, there may be 40 or 45 pounds of one ingredient and 55 or 60 of the other and the resulting compound will make a good explosive of a kind for certain purposes. In fact my experiments have extended over still wider ranges of difference than these in the quantities of the respective ingredients, but after all such tests and experiments it appears that the most perfect and effective admixture for mining, quarrying and the like is within the above figures, with less sugar than chlorate of potash for heavy mining purposes. Assuming that these ingredients are employed in about the above stated proportions, I first prepare the material by mixing the granules together in a dry state. The granules may be of any size desired for particular purposes, but it is best to have them of sensible size as reducing the sensitiveness of the complete powder. Granules the size of the grains of ordinary granulated sugar do very well. With a very fine powder of chlorate or sugar, the compound is much more sensitive and the amount of solution of sugar occurring in the next step may be too great. Ordinary commercial chlorate of potash and sugar may be employed. I prepare the same by thoroughly crushing the said ingredients and mixing them together. Commercial chlorate of potash is usually lumpy and the lumps may be of large size. Ordinary granulated sugar is also apt to be lumpy. Both may require crushing in order to secure granules of a size suitable for forming powder grains. The crushed materials are mixed.

A composition of granules of sugar and of chlorate of potash alone as thus far prepared, while an excellent explosive, is not considered suitable for commercial purposes since the chlorate is naked and exposed to atmospheric influences. I therefore next provide the material with a protective substance which is advantageously also employed to form the components into grains of the size which may be desired for the particular purpose for which the powder is to be employed, as for blasting, gunpowder, etc.

In the next stage of the operation, to complete the manufacture of my new explosive, I dissolve a suitable quantity of a gummy, colloid carbohydrate in a limited amount of water and incorporate the same with the previously admixed granules of sugar and of chlorate of potash. Gum arabic is excellently adapted for my purpose. As to the quantity of the solution employed, something will of course depend upon the amount of the original moisture present in the sugar.

But in all cases the amount of the gummy carbohydrate employed should be small as compared with the total amount of the resulting powder. For 100 pounds of mixture five or six ounces of gum arabic will suffice. With the gum arabic should be supplied just enough water to permit the incorporation. To limit the amount of water and of gum arabic necessary for incorporation to the desired small amount, means should be employed which will permit a very perfect and intimate admixture of this small quantity with the explosive. Incorporation is completed in a suitable incorporating device.

While incorporating the gummy carbohydrate solution with the mixture, more or less sugar from the surface of the sugar granules will dissolve therein but this does no harm and is advantageous. With proper incorporation, the gummy carbohydrate is thoroughly distributed over the surfaces of the chlorate granules. These granules, and the sugar granules as well are thus left coated with a thin filmiform layer of the carbohydrate solution. Chlorate being but slightly soluble, but little if any of such chlorate will dissolve in this film. The admixed material is next dried. This leaves the granules coated, shielded and protected by a filmiform layer of dry, gummy carbohydrate, containing some of the sugar. This coating layer serves to protect the surface of the chlorate from hygroscopic moisture. The condensation of hygroscopic moisture upon the surface of chlorate crystals has been one of the causes making chlorate powder unreliable. This coating layer also serves to unite adjacent granules of chlorate and of sugar to form grains of the size desired. The size of the grain is of course dependent upon the particular means and mechanism adopted for graining and the quantity of moisture added. The filmiform layer therefore serves not only as a protective coating but also as a binder. The granules of chlorate of potash and of sugar, being crystalline in their nature have sharp corners and edges, but with the presence of a spacing and uniting layer of the gummy carbohydrate therebetween, the composition is not sensitive to shock, the gummy layer acting as a cushioning layer. As stated, some slight amount of the sugar will dissolve in the gummy solution but its presence does no harm. In and of itself, the sugar will serve none of the functions desired of the coating and binding substance of the present invention since its solutions dry down to friable, crystalline masses. But it does not confer this property upon the gum solution. However the amount of water employed should not be very great as with much water the gum may be too much diluted with sugar solution.

The new explosive cannot be exploded in the open air. Any quantity thereof, a ton, more or less, may be poured out on the dry ground and fired and it will burn in a white flame but not explode. It is, therefore, safe for handling and shipping and only when it is confined and fired does explosion ensue. Then it is three or four times as powerful as the best dynamite.

What I claim is:—

1. As an explosive a dry, grained mixture of united granules of chlorate of potash and granules of a soluble carbohydrate, said chlorate granules being coated, shielded and protected by a dry filmiform layer composed of a gummy carbohydrate in admixture with some portion of said soluble carbohydrate, said shielding layer also acting as a grain-forming binder between adjacent granules of chlorate and of carbohydrate.

2. As an explosive a dry, grained mixture of united granules of chlorate of potash and granules of sugar, said chlorate granules being coated, shielded and protected by a dry filmiform layer composed of a gummy carbohydrate in admixture with some sugar, said shielding layer also acting as a grain-forming binder between adjacent granules of chlorate and of sugar.

3. As an explosive a dry, grained mixture of united granules of chlorate of potash and granules of sugar, said chlorate granules being coated, shielded and protected by a filmiform layer composed of gum arabic in admixture with some sugar, said shielding layer also acting as a grain-forming binder between adjacent granules of chlorate and of sugar.

4. An explosive compound consisting of granules of sugar and of chlorate of potash in substantially equal quantities and a coating on said granules of gummy carbohydrate binder present in limited amounts and uniting the said granules in grain form.

5. An explosive consisting of 60 to 40 per cent. of granular sugar, 40 to 60 per cent. of granular chlorate of potash, and gum arabic compounded and bonded in fixed grains in which the particles are united by adhesion, said gum arabic forming a filmiform coating on and binder between said particles.

In testimony whereof I affix my signature in presence of two witnesses.

LOFTUS GRAY.

Witnesses:
 F. C. Musson,
 E. M. Fisher,